US006988578B2

(12) United States Patent
Kikuchi et al.

(10) Patent No.: US 6,988,578 B2
(45) Date of Patent: Jan. 24, 2006

(54) AUTOMOTIVE OUTBOARD AIR BAG SYSTEM

(75) Inventors: Yuji Kikuchi, Wako (JP); Yutaka Okamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/405,157

(22) Filed: Apr. 2, 2003

(65) Prior Publication Data

US 2003/0192730 A1    Oct. 16, 2003

(30) Foreign Application Priority Data

Apr. 12, 2002 (JP) .............................. 2002-110330

(51) Int. Cl.
*B60R 21/34* (2006.01)
(52) U.S. Cl. .............. 180/274; 280/730.1; 296/187.04; 296/193.11
(58) Field of Classification Search ................ 180/274; 280/730.1, 743.2; 296/187.04, 193.11; B60R 21/34
See application file for complete search history.

(56) References Cited

U.S. PATENT DOCUMENTS

| 4,449,728 | A | * | 5/1984 | Pilatzki ....................... 280/731 |
| 5,464,250 | A | * | 11/1995 | Sato .......................... 280/743.1 |
| 6,182,782 | B1 | * | 2/2001 | Matsuura et al. ........... 180/274 |
| 6,318,753 | B1 | * | 11/2001 | Valkenburg .............. 280/730.2 |
| 6,497,302 | B2 | * | 12/2002 | Ryan .......................... 180/274 |
| 6,536,800 | B2 | * | 3/2003 | Kumagai et al. ......... 280/743.1 |

FOREIGN PATENT DOCUMENTS

| DE | 26 13 748 | | 10/1977 |
| DE | 44 43 027 | | 6/1996 |
| EP | 1176062 A2 | * | 1/2002 |
| GB | 2 368 562 | | 5/2002 |
| JP | 07-108903 | | 4/1995 |
| JP | 07108903 A | * | 4/1995 |
| JP | 07125606 A | * | 5/1995 |
| JP | 08276816 A | * | 10/1996 |
| JP | 2907556 | | 4/1999 |
| JP | 2001334895 A | * | 12/2001 |
| WO | 02/079009 | | 10/2002 |

* cited by examiner

*Primary Examiner*—Paul N. Dickson
*Assistant Examiner*—Laura B. Rosenberg
(74) *Attorney, Agent, or Firm*—Hamre, Schumann, Mueller & Larson, P.C.

(57) ABSTRACT

An automotive outboard air bag system (30) is provided in which a belt-like strap (34) is provided at substantially a center within an air bag (33) to extend from an upper end portion (33*a*) to a lower end portion (33*b*) of the air bag (33) with sides of the strap (34) being made to extend in a longitudinal direction of a vehicle body, front and rear side edges (34*a*, 34*b*) of the strap (34) are connected to an inner circumference (33*c*) of the air bag (33) to thereby form front and rear constricted portions (35) on front and rear central portions of the air bag (33), and left and right convexly curved portions (36) which can come into contact with an outer surface (12*b*) of a windshield (12) and a garnish (18*b*) of a front pillar (18), respectively, are provided on both sides of the rear constricted portion (35).

3 Claims, 11 Drawing Sheets

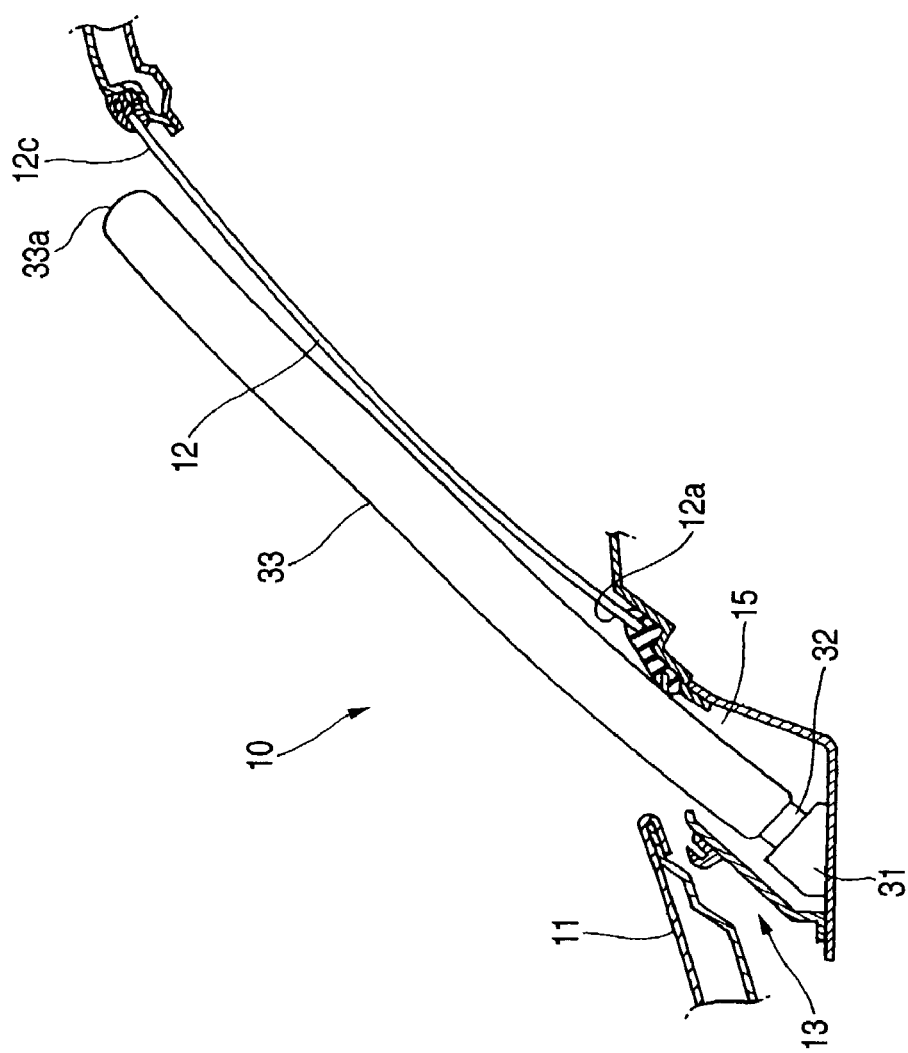
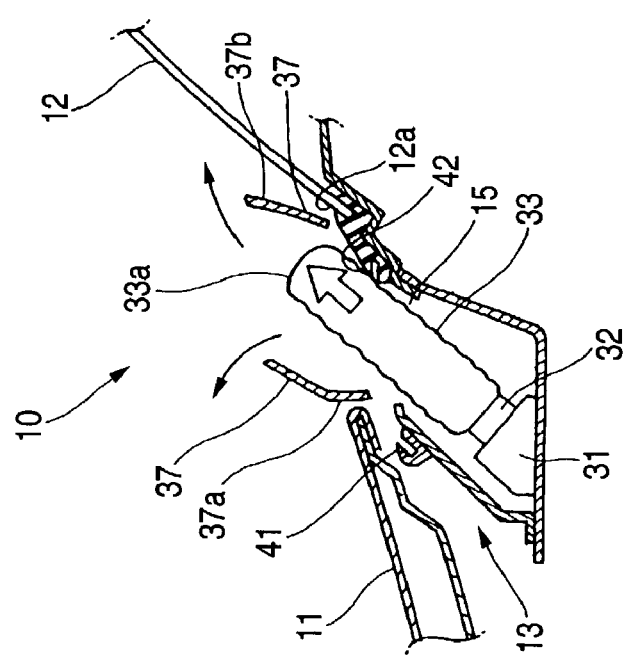
FIG. 3B
FIG. 3A

AUTOMOTIVE OUTBOARD AIR BAG SYSTEM

BACKGROUND OF THE INVENTION

1. Field of the Invention

The present invention relates to an automotive outboard air bag system for relaxing an impact exerted on an object in case a vehicle should collide with the

2. Description of the Related Art

JP-A-7-108903 entitled a "pillar air bag system" proposes an automotive outboard air bag system for relaxing an impact exerted on an object in case a vehicle should collide with the object by deploying an air bag outwardly of the vehicle. A common example of an automotive outboard air bag system of this type will be illustrated in the following drawings.

FIG. 13 is an explanatory view showing a common example of a conventional automotive outboard air bag system.

In case a vehicle 100 should collide against an object (not shown), an impact generated in the vehicle 100 is detected by an impact detection sensor, and an inflator 101 is actuated based on a detection signal from the impact detection sensor.

Gas is generated by the inflator 101, and the gas so generated is fed into an air bag 102 so as to fill the bag. Then, the air bag 102 is inflated to deploy, and a lid body (a lid) of the air bag 102 is broken by virtue of the inflating force of the air bag 102, which is then allowed to inflate and deploy upwardly along an outer surface 103a of a front pillar 103.

FIGS. 14A, 14B are sectional views taken along the line 14—14 in FIG. 13.

When the air bag 102 is inflated and deployed up to an upper end portion 103b of the front pillar 103 the air bag 102 inflates to have a circular cross section, whereby the outer circumference of the air bag 102 comes into contact with a windshield 105 and the outer surface 103a (a garnish) of the front pillar 103.

Here, since the air bag 102 has inflated to have the circular cross section, a distance S7 between a portion 104 where the outer circumference of the air bag 102 comes into contact with the windshield 105 and a portion 104 where the outer circumference of the air bag 102 comes into contact with the outer surface 103a (the garnish) of the front pillar 103 becomes narrow.

Due to this, for example, in case the air bag is inflated to deploy while the vehicle 100 is running, as shown in FIG. 14A, a wind pressure acts on the air bag 102 as indicated by an arrow a, and this may cause a possibility that the air bag 102 deviates from the outer surface 103a (the garnish) of the front pillar 103 as indicated by arrows b and c.

Furthermore, since the distance S7 between the portion 104 where the outer circumference of the air bag 102 comes into contact with-the windshield 105 and the portion 104 where the outer circumference of the air bag 102 comes into contact with the outer surface 103a (the garnish) of the front pillar 103 becomes narrow, as shown in FIG. 14B, in the event that an object 106 collides against an end 102a of the air bag as indicated by an arrow d, there may be caused a possibility that the air bag 102 deviates from the outer surface 103a (the garnish) of the front pillar 103 as indicated by an arrow e.

SUMMARY OF THE INVENTION

Then, an object of the invention is to provide an automotive outboard air bag system which can maintain an air bag in a condition in which the air bag follows a front pillar.

With a view to attaining the object, according to an aspect of the invention, there is provided an automotive outboard air bag system including:

a substantially tubular air bag operable to be inflated to deploy along the outer surface of a vehicle; and a belt-like strap disposed at substantially a center within the air bag in such a manner as to extend in a longitudinal direction of a vehicle body, wherein front and rear side edges of the strap are connected to the air bag, respectively so as to form a constricted portion on a surface of the air bag which faces the outer surface of the vehicle, and wherein convexly curved portions adapted to come into contact with the outer surface of the vehicle are provided on both sides of the constricted portion.

The belt-like strap is provided within the air bag so that the constricted portion is formed on the outer circumferential surface of the air bag which faces the outer surface of the vehicle, whereby the convexly curved portion which can come into contact with the outer surface of the vehicle can be provided on each side of the constricted portion.

According to the construction, the convexly curved portions on the sides of the constricted portion can be brought into contact with the outer surface of the vehicle, respectively. In addition, a longer distance can be secured between one of the convexly curved surfaces of the air bag and the other thereof, whereby the air bag can be disposed on the outer surface of the vehicle in a stable fashion by allowing the convexly curved surfaces provided on the both sides of the constricted portion of the air bag to come into contact with the outer surface of the vehicle, respectively.

Due to this, for example, even if a wind pressure acts on the air bag which has been inflated to deploy from the front of the vehicle, the deviation of the air bag from the front pillar can be prevented.

Furthermore, even if an object comes into collision with an end portion of the air bag from the front of the vehicle, the deviation of the air bag from the front pillar can be prevented.

BRIEF DESCRIPTION OF THE DRAWINGS

FIGS. 3A and 3B are first explanatory views explaining a function of the automotive outboard air bag system (the first embodiment) according to the invention;

DETAILED DESCRIPTION OF THE PREFERRED EMBODIMENTS

Figure 1:
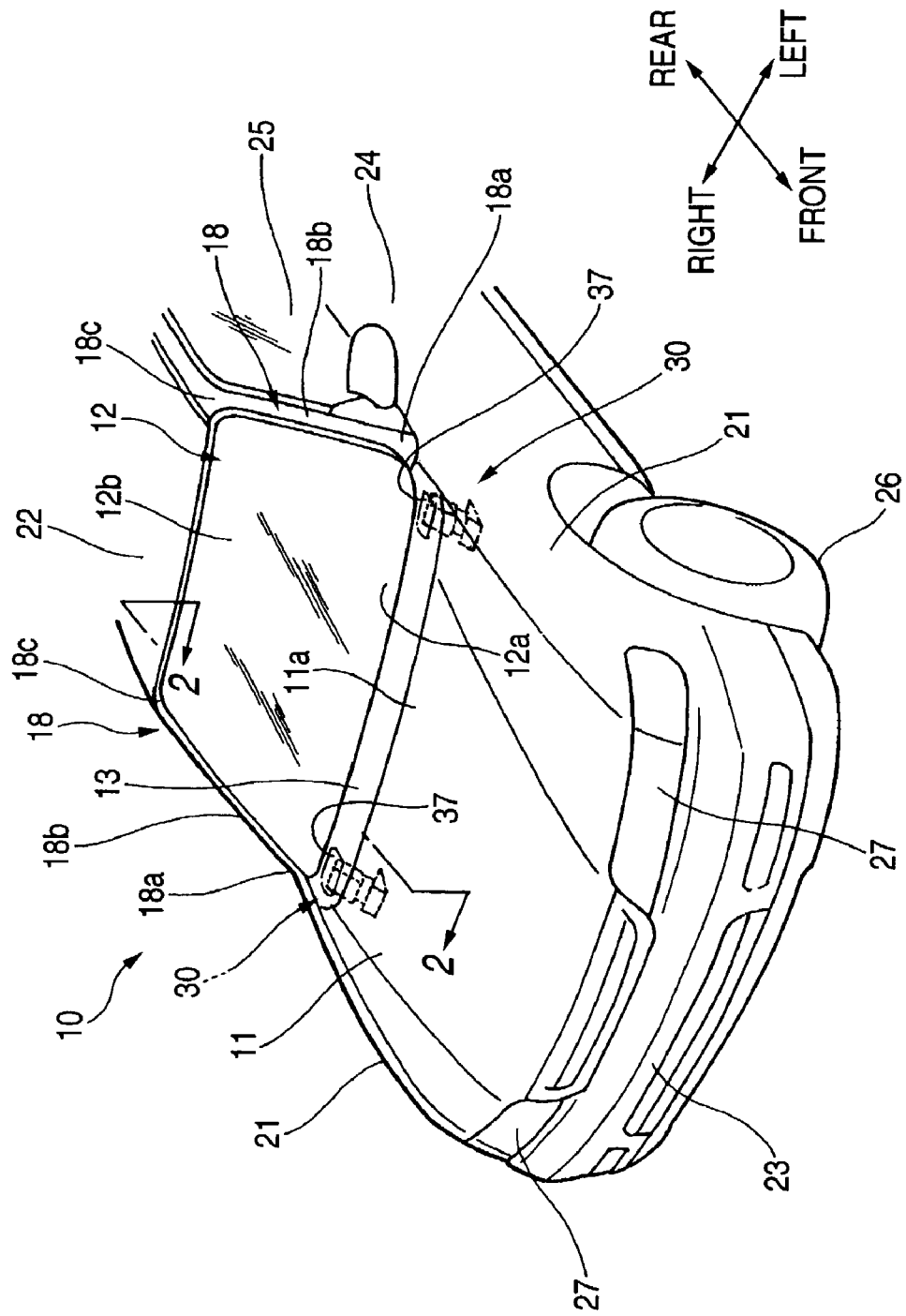
FIG. 1 is a perspective view of a vehicle equipped with an automotive outboard air bag system (a first embodiment) according to the invention.

Embodiments of the invention will be described below based on the accompanying drawings. Here, "front", "rear", "left" and "right" means such directions, respectively, as viewed from the driver. Note that the drawings are viewed in a direction in which reference numerals are shown.

FIG. 1 is a perspective view of a vehicle equipped with automotive outboard air bag systems (a first embodiment) according to the invention.

The vehicle 10 includes a cowl 13 provided in the vicinity of a rear end 11a of a bonnet 11 on a lower end portion 12a side of a windshield 12, and left and right automotive outboard air bag systems 30, 30 provided in the vicinity of lower end portions 18a, 18a of left and right front pillars 18, 18, respectively, in the interior of the cowl 13.

In the figure, reference numeral 21 denotes left and right front fenders, reference numeral 22 a roof, reference numeral 23 a front bumper, reference numeral 24 a front side door, reference numeral 25 a window glass of the front side door, reference numeral 26 a front wheel, and reference numeral 27 a headlamp.

Note that since the left-side automotive outboard air bag system 30 is an identical member to the right-side automotive outboard air bag system 30, the following description will be made only with respect to the left-side automotive outboard air bag system 30 and hence the description of the right-side automotive outboard air bag system 30 will be omitted.

Figure 2:
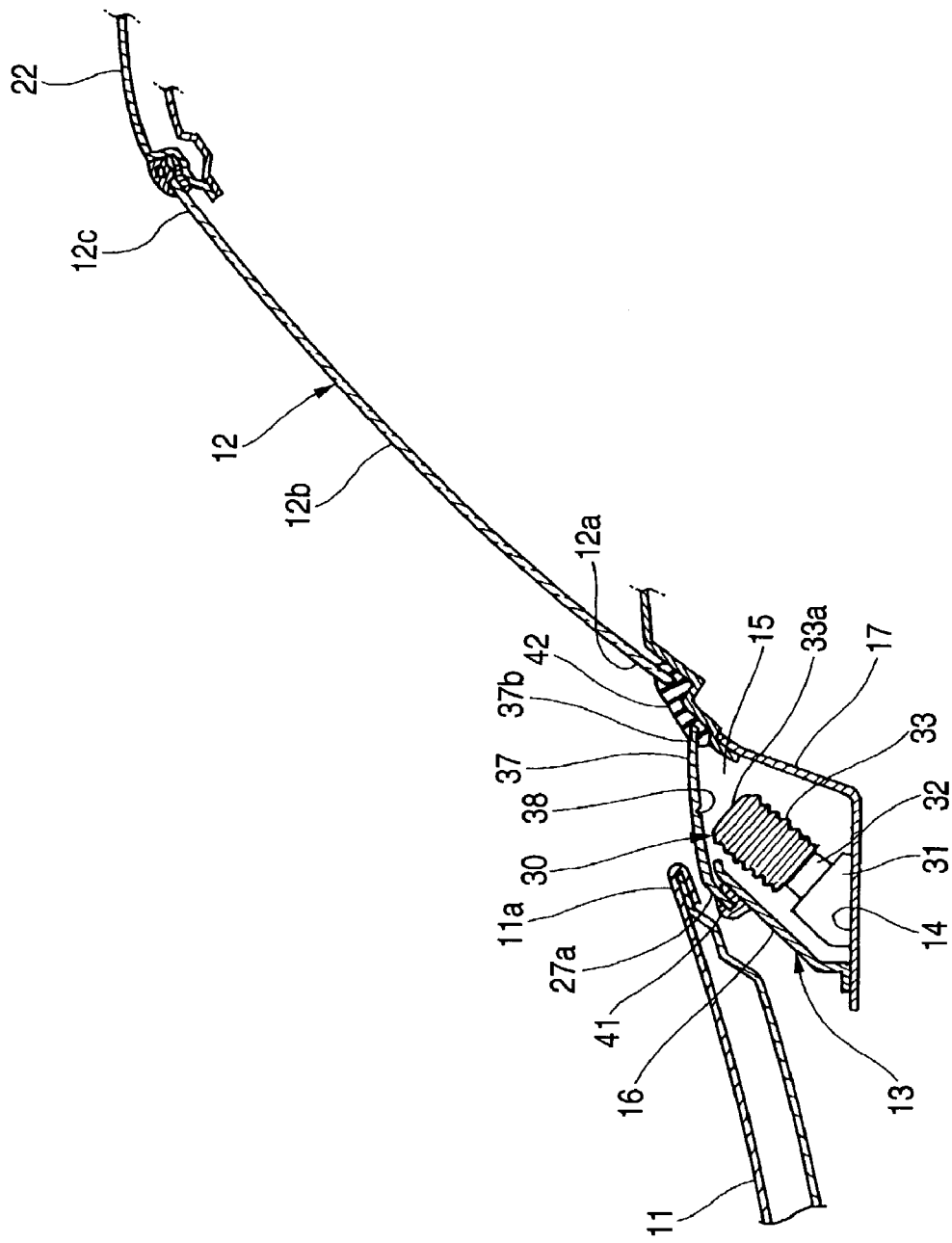
FIG. 2 is a sectional view taken along the line 2—2 in FIG. 1.

FIG. 2 is a sectional view taken along the line 2—2 in FIG. 1 which shows a condition in which the automotive outboard air bag system is accommodated in the interior of the cowl. Note that the automotive outboard air bag system according to the invention is not limited to the example shown in FIG. 2 and can be applied to air bag systems having any other constructions.

The automotive outboard air bag system 30 is constructed such that a base 31 is provided on a bottom portion 14 of the cowl 13, an inflator 32 is attached to an upper end of the base 31, an air bag 33 is attached to the inflator 32, an opening 15 in the cowl 13 is closed with a lid 37, and a breakable groove 38 is formed in the lid 37 so that the lid 37 is broken thereat.

As shown in FIG. 1, the lid 37 is a lid body formed substantially into a rectangular shape which is disposed above the upper end portion 33a of the air bag 33 and is a member which is attached to an upper end of a front wall 16 of the cowl 13 at a front end 37a thereof with a sealing compound 41 and to an upper end of a rear wall 17 of the cowl 13 at a rear end 37b thereof with a sealing compound 42.

By forming the breakable groove 38 in the lid 37 substantially at a center thereof, when the air bag 33 is inflated to deploy, the upper end portion 33a of the air bag 33 is pressed against a back of the lid 37, and when the air bag 33 is inflated to deploy further from this condition, the air bag 33 is allowed to be broken from the breakable groove 38 with the inflating and deploying force of the air bag 33.

Next, functions of the automotive outboard air bag system 30 will be described based on FIGS. 3 to 6.

FIGS. 3A, 3B are first explanatory views explaining a function of the automotive outboard air bag system (the first embodiment) according to the invention.

In FIG. 3A, in the event that the vehicle 10 collides against an object (not shown), an impact generated in the vehicle 10 is detected by an impact detection sensor (not shown), and the inflator 32 is actuated based on a detection signal from the impact detection sensor.

Gas is generated in the inflator 32, and the gas so generated is fed into the air bag 33 to fill the bag. The air bag 33 is inflated to deploy and is then pressed against the lid 37, and the breakable groove 38 in the lid 37 is broken with the inflating and deploying force of the air bag 33.

Thus, the lid 37 is separated apart from the center thereof and is then removed from the opening 15 of the cowl 13 as indicated by arrows, whereby the air bag is allowed to be inflated to deploy upwardly from the opening 15 of the cowl 13.

In FIG. 3B, when the gas generated with in the inflator 32 is fed further into the air bag 33 so as to fill the bag, the air bag 33 is inflated further to deploy to an upper end portion 18c of the front pillar 18 (shown in FIG. 1) and an upper end portion 12c of the windshield 12.

Figure 4:
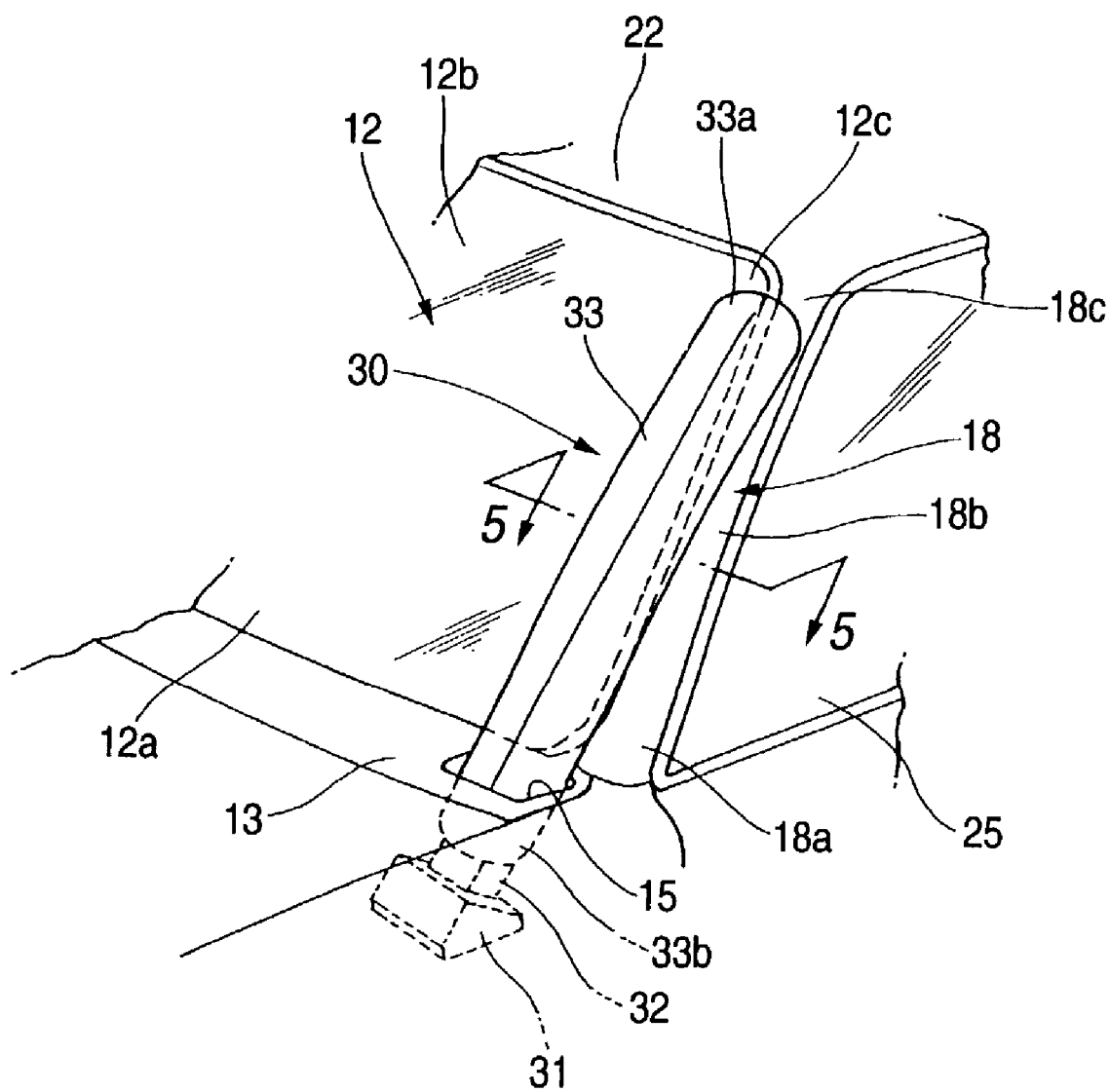
FIG. 4 is a second explanatory view explaining another function of the automotive outboard air bag system (the first embodiment) according to the invention.

FIG. 4 is a second explanatory view explaining another function of the automotive outboard air bag system (the first embodiment) according to the invention.

When the air bag 33 is inflated to deploy upwardly from the opening 15 of the cowl 13 to thereby complete the inflation and deployment thereof, the air bag 33 is then disposed to extend along the outer surface 18b of the front pillar 18 and the outer surface 12b of the windshield 12.

Figure 5:
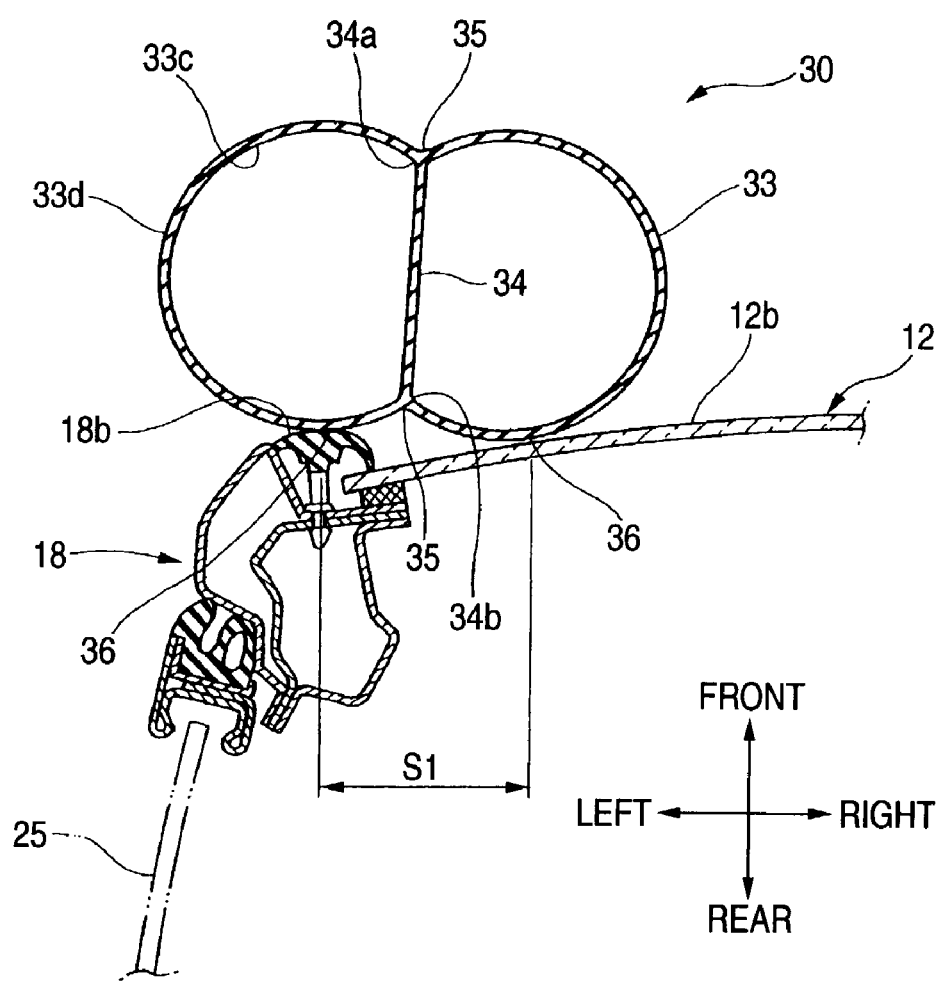
FIG. 5 is a third explanatory view explaining a further function of the automotive outboard air bag system (the first embodiment) according to the invention.

FIG. 5 is a third explanatory view explaining the function of the automotive outboard air bag system (the first embodiment) according to the invention and is a sectional view taken along the line 5—5 in FIG. 4.

The automotive outboard air bag system 30 is constructed such that a belt-like strap 34 is provided at substantially a center within the air bag 33 in such a manner as to extend from the upper end portion 33a to the lower end portion 33b (refer to FIG. 4) of the air bag 33. And, the strap 34 is disposed such that sides thereof extend in a longitudinal direction of a vehicle body, front and rear side edges 34a, 34b of the strap 34 are connected to an inner circumference 33c of the air bag 33, respectively. With this construction, the air bag system 30 form front and rear constricted portions 35, 35 at front and rear central portions of the air bag 33, and left and right convexly curved portions 36, 36 which can come into contact with the outer surface of the vehicle (namely, the outer surface 12b of the windshield 12 and the outer surface (a garnish) 18b of the front pillar 18) are provided on both sides of the rear constricted portion 35.

While a flexible belt-like strap formed of a fabric base or rubber is described as being used for the strap 34, as an example, in this embodiment, the material of the strap is not limited thereto.

The left and right convexly curved portions 36, 36 are formed in a curved fashion so as to protrude rearward of the rear constricted portion 35 or toward the windshield 12 and the front pillar 18.

According to the construction, the convexly curved portions 36, 36 provided on the both (left and right) sides of the rear constricted portion 35 can be brought into contact with the outer surface of the vehicle (namely, the outer surface 12*b* of the windshield 12 and the outer surface (the garnish) 18*b* of the front pillar 18).

Here, a long distance S1 can be secured between the left and right convexly curved portions 36, 36 by forming the left and right convexly curved portions 36, 36 on the both sides of the rear constricted portion 35, respectively. Thus, by allowing the left and right convexly curved portions to be brought into contact with the outer surface of the vehicle (namely, the outer surface 12*c* of the windshield 12 and the outer surface (the garnish) 18*b* of the front pillar 18) while the long distance S1 is secured between the left and right convexly curved portions 36, 36, the air bag 33 can be disposed on the outer surface of the vehicle in a stable fashion.

Figure 6A:
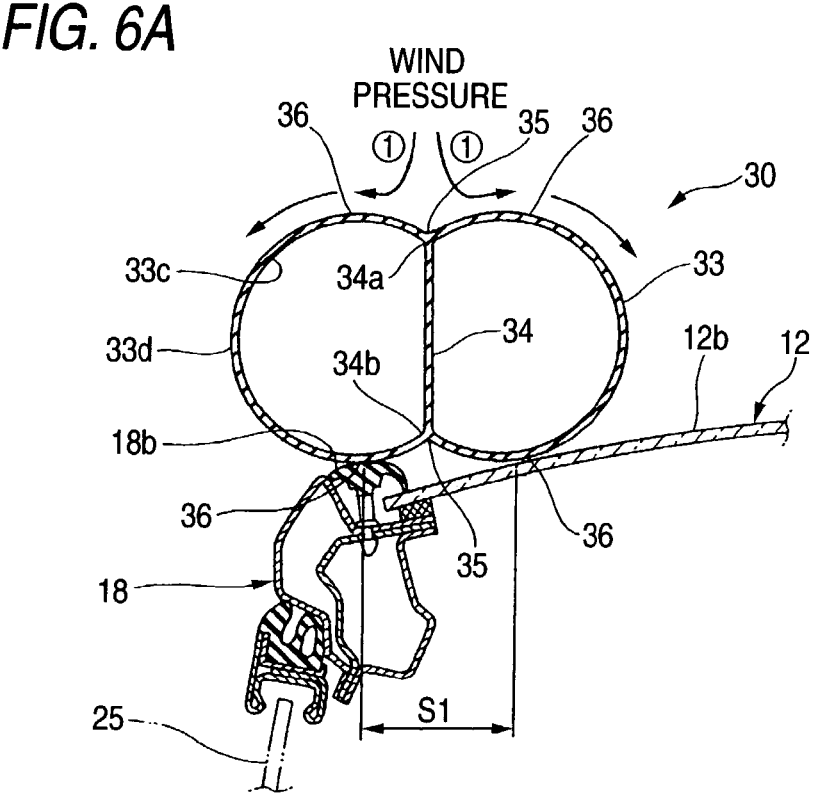
FIGS. 6A and 6B are fourth explanatory views explaining a function of the automotive outboard air bag system (the first embodiment) according to the invention.
Figure 6B:
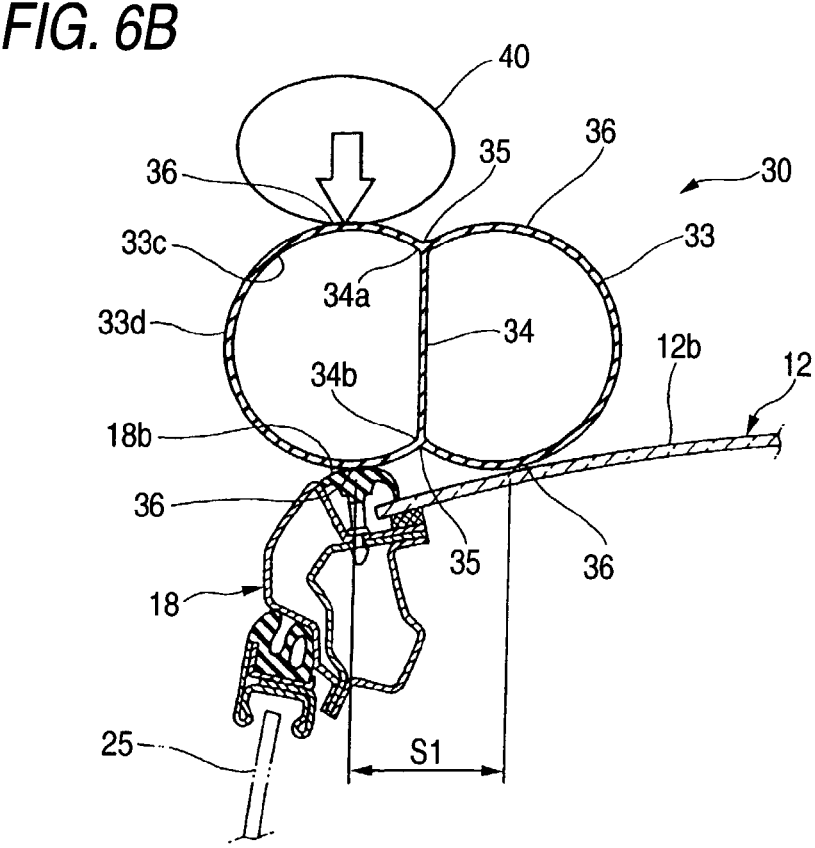

FIGS. 6A, 6B are fourth explanatory views explaining a further function of the automotive outboard air bag system (the first embodiment) according to the invention.

In FIG. 6A, since the air bag 33 is disposed stably on the outer surface of the vehicle by bringing the left and right convexly curved portions 36, 36 into contact with the outer surface of the vehicle (namely, the outer surface 12*b* of the windshield 12 and the outer surface (the garnish) 18*b* of the front pillar 18) while the long distance S1 is being secured between the left and right convexly curved portions, for example, even if a wind pressure acts on the inflated and deployed air bag 33 from a front side of the vehicle as indicated by arrows ①, the deviation of the air bag from the garnish 18*b* of the front pillar 18 and the outer surface 12*b* of the windshield can be prevented.

In FIG. 6B, since the air bag 33 is disposed stably on the outer surface of the vehicle by bringing the left and right convexly curved portions 36, 36 into contact with the outer surface of the vehicle (namely, the outer surface 12*b* of the windshield 12 and the outer surface (the garnish) 18*b* of the front pillar 18) while the long distance S1 is being secured between the left and right convexly curved portions, in the event that an object 40 comes into collision with an end portion of the air bag 33 (for example, the vicinity of a front portion of the left convexly curved portion 36) from the front side of the vehicle, the deviation of the air bag 33 from the garnish 18*b* of the front pillar 18 and the outer surface 12*b* of the windshield 12 can be prevented.

Thus, since the air bag 33 can be kept extending along the garnish 18*b* of the front pillar 18 and the outer surface 12*b* of the windshield 12, the impact exerted on the colliding object 40 can efficiently be absorbed by the inflated and deployed air bag 33.

Figure 7A:
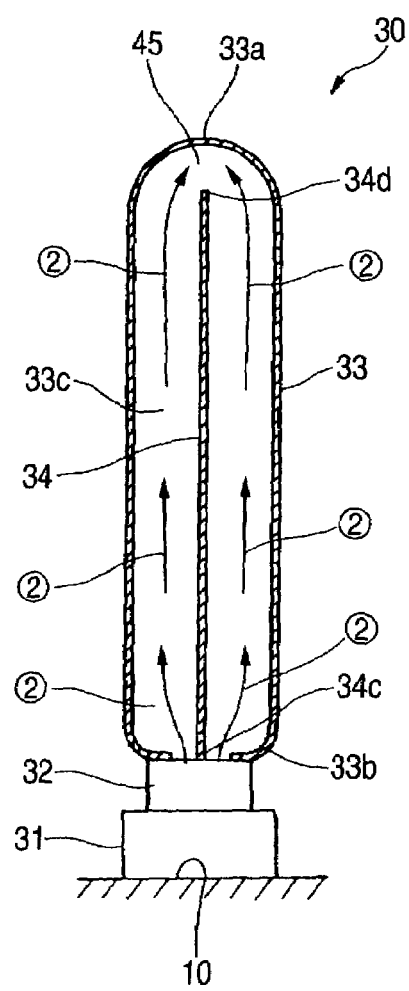
FIGS. 7A and 7B are fifth explanatory views explaining another function of the automotive outboard air bag system (the first embodiment) according to the invention.
Figure 7B:
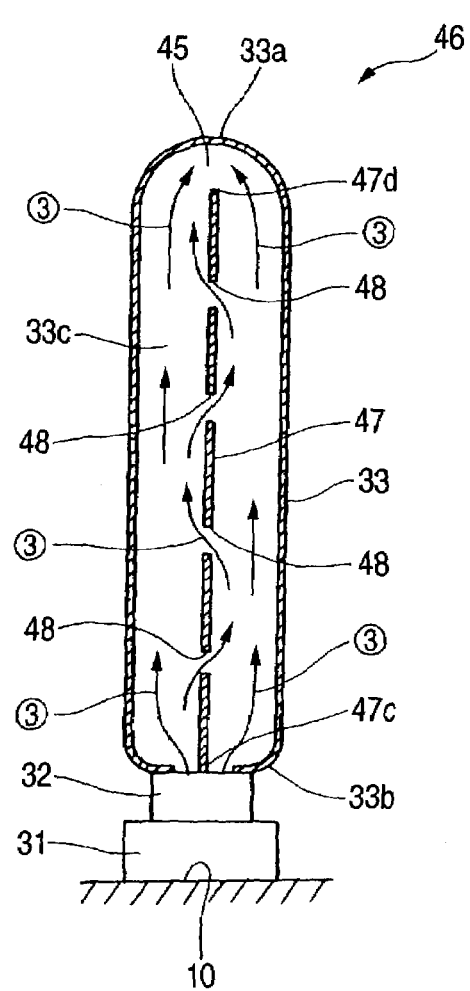

FIGS. 7A, 7B are fifth explanatory views explaining a function of the automotive outboard air bag system (the first embodiment) according to the invention, and FIG. 7A shows the air bag according to the first embodiment whereas FIG. 7B shows a modified example to the first embodiment. Note that like reference numerals are imparted to constituent members of the modified example which are like to those of the automotive outboard air bag system of the first embodiment, and the description thereof will be omitted.

The automotive outboard air bag system 30 shown in FIG. 7A is constructed such that the belt-like strap 34 is provided at substantially the center within the air bag 33 to extend from the upper end portion 33*a* to the lower end portion 33*b* of the air bag 33 in such a manner that a lower end portion 34*c* of the strap 34 is connected to the inflator 32 whereas an upper end portion 34*d* of the strap 34 is disposed away from the upper end portion 33*a* of the air bag 33 by a predetermined distance 45, and the front and rear side edges 34*a*, 34*b* (refer to FIG. 5) of the strap 34 are connected to the inner circumference 33*c* of the air bag 33 to thereby vertically divide an internal space of the air bag 33 into two halves.

A gas flow path from the inflator 32 can be set to be thin by dividing vertically the internal space of the air bag 33 with the strap 34. Due to this, in a case where gas is fed into the air bag 33 from the inflator 32 as indicated by arrows ② so as to fill the bag, the gas so fed reaches to the upper end portion 33*a* of the air bag 33 instantaneously.

Thus, it is possible to maintain an area on an upper end portion 33*a* side of the air bag 33 in a relatively highly pressurized condition and an area on a lower end portion 33*b* side of the air bag 33 in a relatively low pressurized condition.

Incidentally, while the example is described in FIG. 7A in which the upper end portion 34*d* of the strap 34 is disposed so as to be spaced away from the upper end portion 33*a* of the air bag 33 by the predetermined distance 45, it is possible to produce two completely independent internal spaces within the air bag 33 by extending the upper end portion 34*d* of the strap 34 to the upper end portion 33*a* of the air bag 33.

Thus, it is possible to divide the interior of the air bag 33 into internal spaces of a small capacity by dividing the interior of the air bag 34 into the two independent spaces, whereby the increasing rate of pressure within the air bag 33 can be enhanced when the object 40 shown in FIG. 6B comes into collision with the air bag 33.

Thus, the initial internal pressure of the air bag 33 can be set low, and the volume of gas generated from the inflator 32 can be kept low, whereby the miniaturization of the inflator 32 can be attempted.

An automotive outboard air bag system 46 shown in FIG. 7B is a modified example in which the strap 34 of the first embodiment shown in FIG. 7A is replaced by a belt-like strap 47 having openings 48 formed therein.

The air bag 33 is divided vertically into two spaces with the strap 47, and the openings 48 are formed in the strap 47, whereby gas can be fed into the air bag 33 from the inflator 32 as indicated by arrows ③ so as to fill the bag.

According to the construction, since gas from the inflator 32 can be fed into the air bag 33 with good balance, the internal pressure in the entire area of the air bag 33 can be maintained uniformly.

In addition, by adjusting the size and configuration of the openings 48 formed in the strap 47, there is provided an advantage that the increasing rate of pressure within the air bag 33 can be controlled such that an impact exerted on an object when the object comes into collision with the air bag 33 can efficiently be absorbed by the air bag 33.

Next, second to sixth embodiments of the invention will be described based on FIGS. 8 to 12. Note that like reference numerals are imparted to some of constituent members of the second and third embodiments which are like to those of the automotive outboard air bag system according to the first embodiment, and the description thereof will be omitted.

Figure 8:
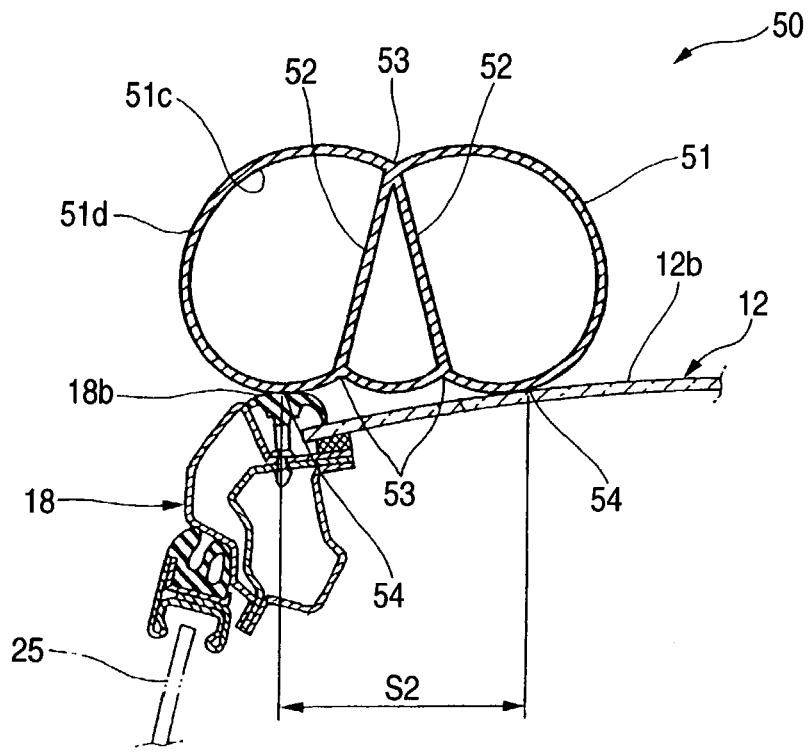
FIG. 8 is a sectional view of an automotive outboard air bag system (a second embodiment) according to the invention.

FIG. 8 is a sectional view of an automotive outboard air bag system (the second embodiment) according to the invention.

The automotive outboard air bag system 50 is different from the automotive outboard air bag system 30 of the first embodiment only in that two straps 52, 52 are provided at substantially a center within an air bag 51 in such a manner that sides thereof extend in the longitudinal direction of the vehicle body in substantially an inverted V-like configuration, and the remaining construction of the automotive outboard air bag system 50 according to the second embodiment is the same as that of the first embodiment.

Note that reference numeral 51c denotes an inner circumference of the air bag 51 to which front and rear side edges of the straps 52, 52 are connected, and reference numeral 51d denotes an outer circumference of the air bag 51.

By providing the two straps 52, 52 at substantially the center within the air bag 51 in substantially the inverted V-like configuration, a front constricted portion 53 is formed at a front central portion of the air bag 51 and left and right rear constricted portions 53, 53 are formed at rear central portions of the air bag 51. A left convexly curved portion 54 which can come into contact with the outer surface of the vehicle (the outer surface (the garnish) 18b of the front pillar 18) is provided on a left side of the left rear constricted portion 53 and a right convexly curved portion 54 which can come into contact with the outer surface of the vehicle (the outer surface 12b of the windshield 12) is provided on a right side of the right rear constricted portion 53.

The left and right convexly curved portions 54, 54 are formed in a curved configuration in such a manner as to protrude rearward of the left and right constricted portion 53, 53.

According to the construction, the left and right convexly curved portions 54, 54 can be brought into contact with the outer surface of the vehicle (namely, the outer surface 12b of the windshield 12 and the outer surface (the garnish) 18b of the front pillar 18), respectively.

Here, since the straps 52, 52 are provided in substantially the inverted V-like configuration, a distance S2 which is longer than the distance S1 secured according to the first embodiment can be secured between the left and right convexly curved portions 54, 54.

Thus, according to the second embodiment, since the distance S2 between the left and right convexly curved portions 54, 54 can be secured greater than the distance S1 of the first embodiment, the left and right convexly curved portions 54, 54 are brought into contact with the outer surface of the vehicle (namely, the outer surface 12b of the windshield 12 and the outer surface (the garnish) 18b of the front pillar 18), respectively, whereby the air bag 33 can be disposed on the outer surface of the vehicle in a more secured fashion.

Figure 9:
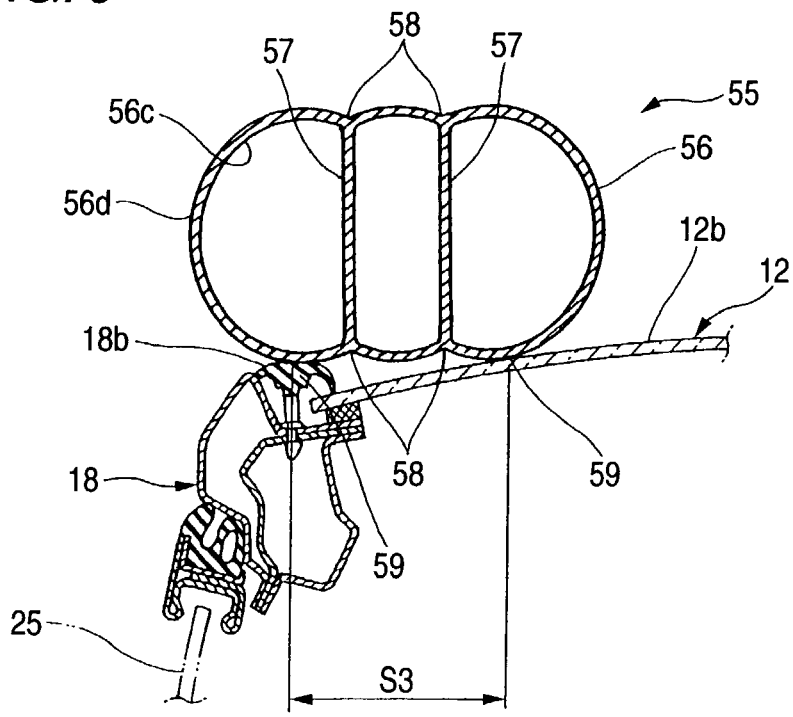
FIG. 9 is a sectional view of an automotive outboard air bag system (a third embodiment) according to the invention.

FIG. 9 is a sectional view of an automotive outboard air bag system (the third embodiment) according to the invention.

An automotive outboard air bag system 55 is different from the automotive outboard air bag system 30 of the first embodiment only in that two straps 57, 57 are provided in substantially parallel with each other at a predetermined interval at substantially a center within an air bag 56 in such a manner that sides thereof extend in the longitudinal direction of the vehicle body, and the remaining construction of the automotive outboard air bag system 55 according to the third embodiment is the same as that of the first embodiment.

Note that reference numeral 56c denotes an inner circumference of the air bag 56 to which front and rear edges of the straps 57, 57 are connected, respectively, and reference numeral 56d denotes an outer circumference of the air bag 56.

By providing the two straps 57, 57 in substantially parallel with each other at the predetermined interval at substantially the center within the air bag 56, left and right front constricted portions 58, 58 are formed at front central portions of the air bag 56 and left and right rear constricted portions 58, 58 are formed at rear central portions of the air bag 56. In addition, a left convexly curved portion 59 which can come into contact with the outer surface of the vehicle (the outer surface (the garnish) 18b of the front pillar 18) is provided on a left side of the left rear constricted portion 58, and a right convexly curved portion 59 which can come into contact with the outer surface of the vehicle (the outer surface 12b of the windshield 12) is provided on a right side of the right rear constricted portion 58.

The left and right convexly curved portions 59, 59 are formed in a curved fashion so that the convexly curved portions protrude rearward of the left and right rear constricted portions 58, 58, respectively.

According to this construction, the left and right convexly curved portions 59, 59 are allowed to be brought into contact with the outer surface of the vehicle (namely, the outer surface 12b of the windshield 12 and the outer surface (the garnish) 18b of the front pillar 18), respectively.

Here, since the straps 57, 57 are provided in substantially parallel with each other at the predetermined interval, a distance S3 between the left and right convexly curved portions 59, 59 can be secured greater than the distance S1 secured in the first embodiment.

Thus, according to the third embodiment, since the distance S3 between the left and right convexly curved portions 59, 59 can be secured greater than the distance S1 secured in the first embodiment, the air bag 56 can be disposed on the outer surface of the vehicle more stably by allowing the left and right convexly curved portions 59, 59 to be brought into contact with the outer surface of the vehicle (namely, the outer surface 12b of the windshield 12 and the outer surface (the garnish) 18b of the front pillar 18).

Figure 10:
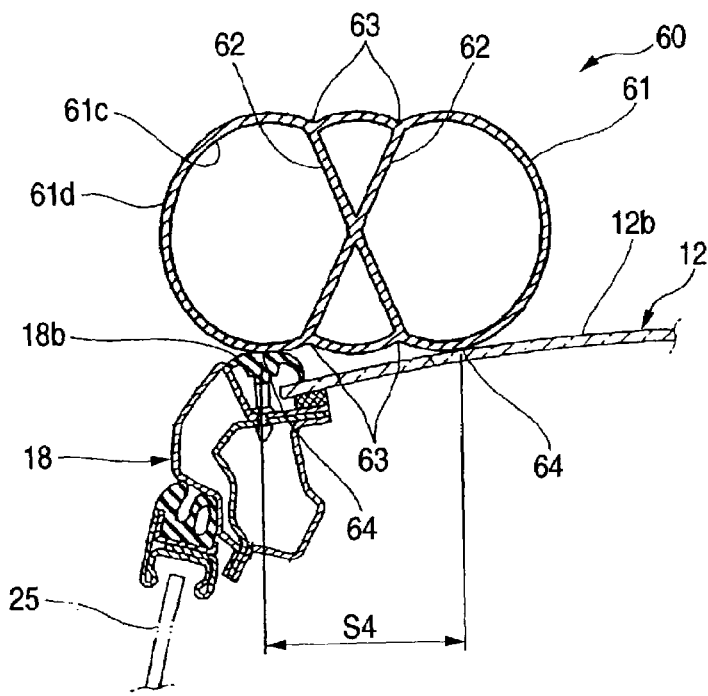
FIG. 10 is a sectional view of an automotive outboard air bag system (a fourth embodiment) according to the invention.

FIG. 10 is a sectional view of an automotive outboard air bag system (the fourth embodiment) according to the invention.

An automotive outboard air bag system 60 is different from the automobile outboard air bag system 30 of the first embodiment only in that two straps 62, 62 are provided at substantially a center within an air bag 61 in such a manner that sides thereof extend in the longitudinal direction of the vehicle body in substantially an X-like configuration, and the remaining construction of the automotive outboard air bag system 60 according to the fourth embodiment is the same as that of the first embodiment.

Note that reference numeral 61c denotes an inner circumference of the air bag 61 to which front and rear edges of the straps 62, 62 are connected, and reference numeral 61d denotes an outer circumference of the air bag 61.

By providing the two straps 62, 62 in substantially the X-like configuration at substantially the center within the air bag 61, left and right front constricted portions 63, 63 are formed at front central portions of the air bag 61 and left and right rear constricted portions 63, 63 are formed at rear central portions of the air bag 61. In addition, a left convexly curved portion 64 which can come into contact with the outer surface of the vehicle (the outer surface (the garnish) 18b of the front pillar 18) is provided on a left side of the left rear constricted portion 63, and a right convexly curved portion 64 which can come into contact with the outer surface of the vehicle (the outer surface 12b of the windshield 12) is provided on a right side of the right rear constricted portion 63.

The left and right convexly curved portions 64, 64 are formed in a curved fashion so that the convexly curved portions protrude rearward of the left and right rear constricted portions 63, 63, respectively.

According to this construction, the left and right convexly curved portions 64, 64 are allowed to be brought into contact with the outer surface of the vehicle (namely, the outer surface 12b of the windshield 12 and the outer surface (the garnish) 18b of the front pillar 18), respectively.

Here, since the straps 62, 62 are provided in substantially the X-like configuration, a distance S4 between the left and right convexly curved portions 64, 64 can be secured greater than the distance S1 secured in the first embodiment.

Thus, according to the fourth embodiment, since the distance S4 between the left and right convexly curved portions 64, 64 can be secured greater than the distance S1 secured in the first embodiment, the air bag 61 can be disposed on the outer surface of the vehicle more stably by allowing the left and right convexly curved portions 64, 64 to be brought into contact with the outer surface of the vehicle (namely, the outer surface 12b of the windshield 12 and the outer surface (the garnish) 18b of the front pillar 18).

Figure 11:
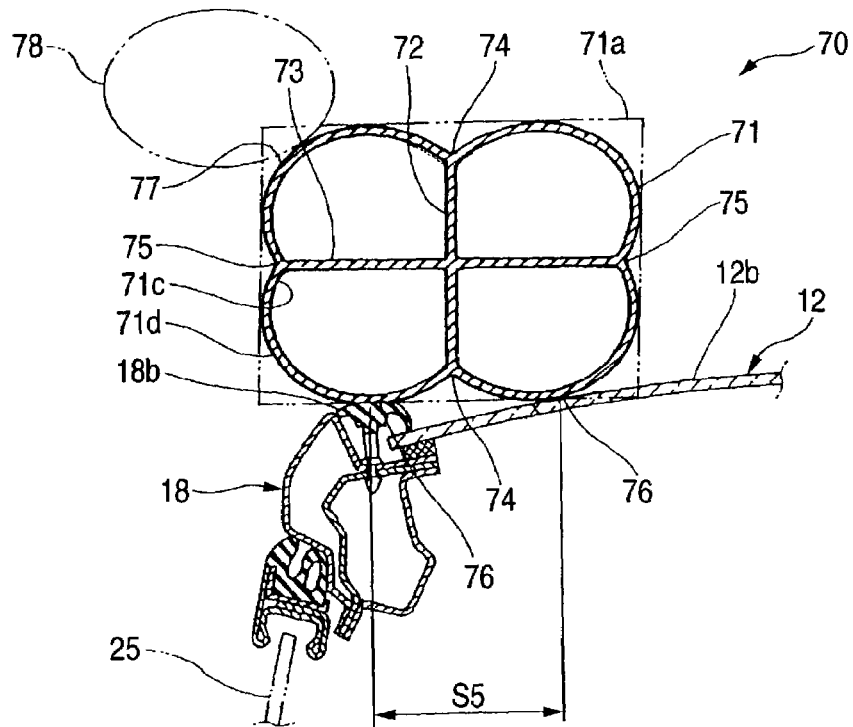
FIG. 11 is a sectional view of an automotive outboard air bag system (a fifth embodiment) according to the invention.

FIG. 11 is a sectional view of an automotive outboard air bag system (the fifth embodiment) according to the invention.

An automotive outboard air bag system 70 has a strap 72 provided at substantially a center within an air bag 71 in such a manner that sides thereof extend in the longitudinal direction of the vehicle, as with the first embodiment, as well as a strap 73 provided in such a manner that sides thereof extend in a transverse direction of the vehicle body so that the strap 73 intersects with the strap 72 at right angles.

The automotive outboard air bag system 70 according to the fifth embodiment is different from the automotive outboard air bag system 30 according to the first embodiment only in that the strap 73 is provided such that the sides thereof extend in the transverse direction of the vehicle body so that the strap 73 intersects with the strap 72 at right angles, and the remaining construction of the automotive outboard air bag system of the fifth embodiment is the same as that of the first embodiment.

Note that reference numeral 71c denotes an inner circumference of the air bag 71 to which front and rear edges of the strap 72 and left and right edges of the strap 73 are connected, and reference numeral 71d denotes an outer circumference of the air bag 71.

By providing the strap 72 at substantially the center within the air bag 71 in such a manner that the sides thereof extend in the longitudinal direction of the vehicle body, a front constricted portion 74 is formed at a front central portion of the air bag 71, and a rear constricted portion 74 is formed at a rear central portion of the air bag 71. In addition, a left convexly curved portion 76 which can come into contact with the outer surface of the vehicle body (the outer surface (the garnish) 18b of the front pillar 18) is provided on a left side of the rear constricted portion 74, and a right convexly curved portion 76 which can come into contact with the outer surface of the vehicle (the outer surface 12b of the windshield 12) is provided on a right side of the rear constricted portion 74.

The left and right convexly curved portions 76, 76 are formed in a curved fashion so that the convexly curved portions protrude rearward of the rear constricted portion 74.

According to this construction, the left and right convexly curved portions 76, 76 are allowed to be brought into contact with the outer surface of the vehicle (namely, the outer surface 12b of the windshield 12 and the outer surface (the garnish) 18b of the front pillar 18).

A distance S5 between the left and right convexly curved portions 76, 76 can be secured as substantially largely as the distance S1 secured in the first embodiment.

Thus, according to the fifth embodiment of the invention, since the distance S5 between the left and right convexly curved portions 76, 76 can be secured as substantially largely as the distance S1 secured in the first embodiment, the air bag 71 can be disposed on the outer surface of the vehicle more stably by allowing the left and right convexly curved portions 76, 76 to be brought into contact with the outer surface of the vehicle body (namely, the outer surface 12b of the windshield and the outer surface (the garnish) 18b of the front pillar 18).

In addition, by providing the strap 72 within the air bag 71 in such a manner that the strap 72 intersects with the strap 73 at right angles, left and right constricted portions 75, 75 are provided on left and right outer surfaces of the air bag 71, respectively, whereby the air bag 71 can be formed into substantially a rectangular shape 71a as indicated by an imaginary line, and the left and right outer surfaces 77 of the air bag 71 can be formed into curved surfaces which are smaller than the left and right side walls of the air bag 33 (refer to FIG. 5) of the first embodiment.

Consequently, according to the fifth embodiment, a transverse deviation of the air bag 71 can be restrained efficiently even in the event that an object 78 comes into collision with the curved surface of 77 the air bag 71.

Figure 12:
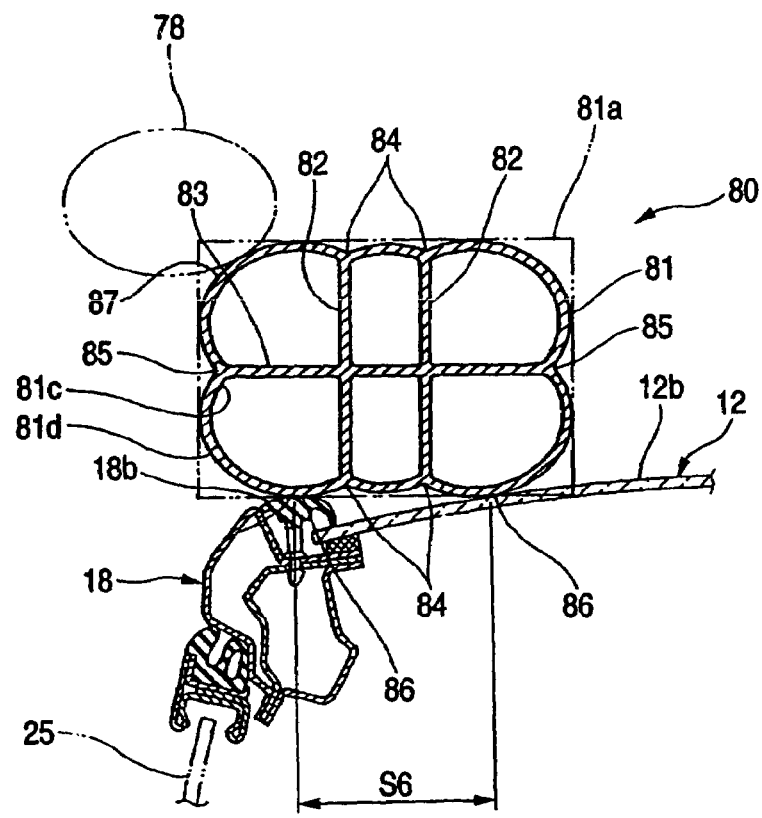
FIG. 12 is a sectional view of an automotive outboard air bag system (a sixth embodiment) according to the invention.
Figure 13:
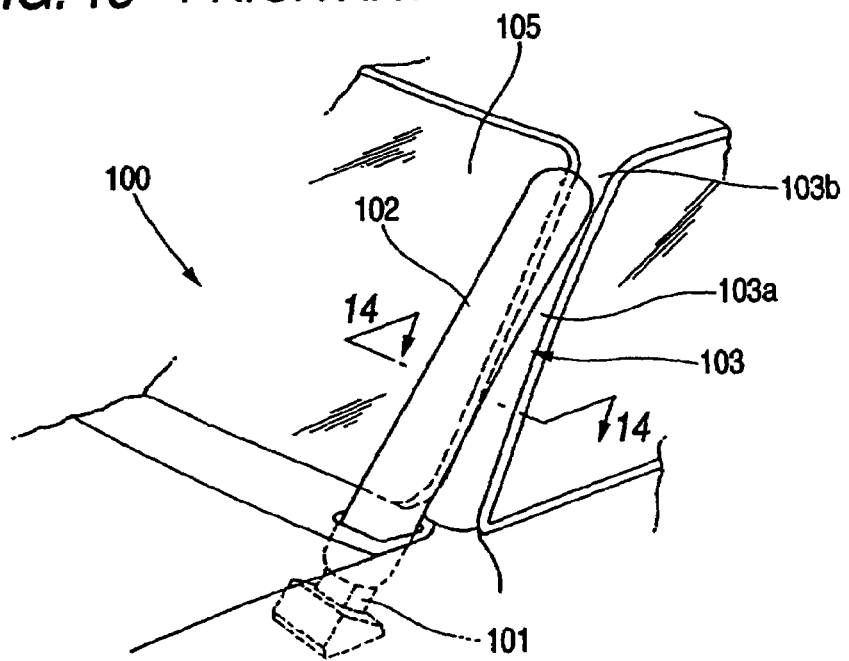
FIG. 13 is an explanatory view showing a common example of a conventional front pillar air bag.
Figure 14A:
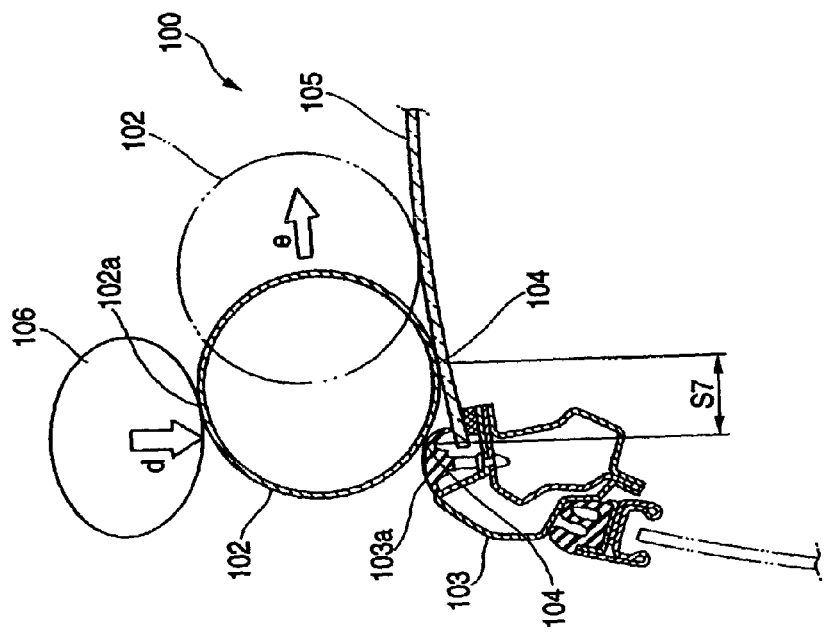
FIGS. 14A and 14B are sectional views taken along the line 14—14 in FIG. 13.
Figure 14B:
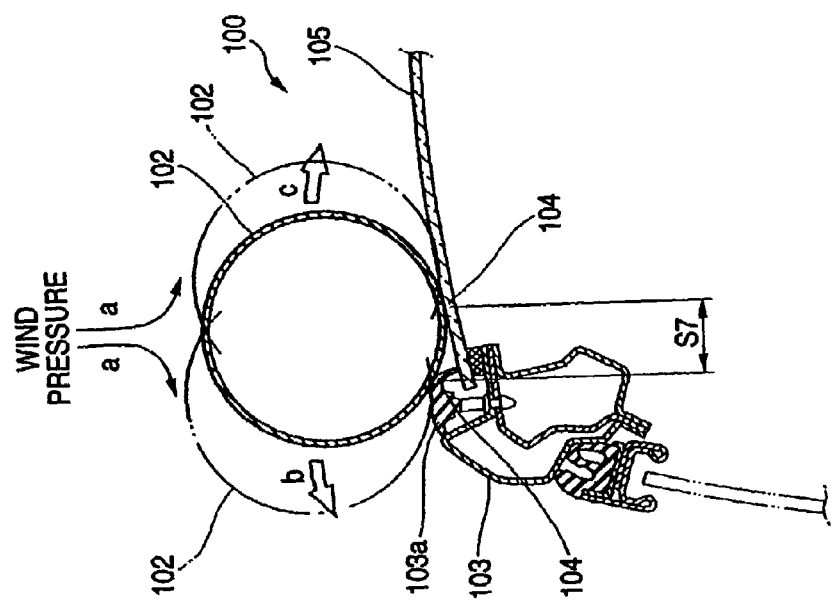

FIG. 12 is a sectional view of an automotive outboard air bag system (the sixth embodiment) according to the invention.

An automotive outboard air bag system 80 is different from the automotive outboard air bag system 30 of the first embodiment only in that left and right straps 82, 82 are provided at substantially central portions within an air bag 81 in such a manner that sides thereof extend in the longitudinal direction of the vehicle body and a strap 83 is provided such that sides thereof extend in the transverse direction of the vehicle body so that the strap 83 intersects with the straps 82, 82 at right angles, and the remaining construction of the automotive outboard air bag system according to the sixth embodiment is the same as that of the first embodiment.

Note that reference numeral 81c denotes an inner circumference of the air bag 81 to which front and rear edges of the straps 82, 82 and left and right edges of the strap 83 are connected, and reference numeral 81d denotes an outer circumference of the air bag 81.

By providing the left and right straps 82, 82 at substantially the central portions within the air bag 81 in such a manner that the sides thereof extend in the longitudinal direction of the vehicle body, left and right front constricted portions 84, 84 are formed at front central portions of the air bag 81, and left and right rear constricted portions 84, 84 are formed at rear central portions of the air bag 81. In addition, a left convexly curved portion 86 which can come into contact with the outer surface of the vehicle (the outer surface (the garnish) 18b of the front pillar 18) is provided on a left side of the left rear constricted portion 84, and a right convexly curved portion 86 which can come into contact with the outer surface of the vehicle (the outer surface 12b of the windshield 12) is provided on a right side of the right rear constricted portion 84.

The left and right convexly curved portions 86, 86 are formed into a curved fashion so that the convexly curved portions protrude rearward of the left and right rear constricted portions 84.

According to the construction, the left and right convexly curved portions 86, 86 are allowed to be brought into contact with the outer surface of the vehicle (namely, the outer surface 12b of the windshield 12 and the outer surface (the garnish) 18b of the front pillar 18), respectively.

A distance S6 between the left and right convexly curved portions 86, 86 can be secured much greater than the distance S1 secured in the first embodiment.

Thus, according to the sixth embodiment of the invention, since the distance S6 between the left and right convexly curved portions 86, 86 can be secured much greater than the distance S1 secured in the first embodiment, the air bag 71 can be disposed on the outer surface of the vehicle body more stably by allowing the left and right convexly curved portions 86, 86 to be brought into contact with the outer surface of the vehicle body (namely, the outer surface 12b of the windshield 12 and the outer surface (the garnish) 18b of the front pillar 18), respectively.

In addition, by providing the strap 83 within the air bag 81 in such a manner as to intersect with the left and right straps 82, 82 at right angles, left and right constricted portions 85, 85 are provided on left and right outer surfaces of the air bag 81, respectively, whereby the air bag 81 can be formed into substantially a rectangular shape 81a as indicated by an imaginary line, and the left and right outer surfaces 87 of the air bag 81 can be formed into curved surfaces which are smaller than the left and right side walls of the air bag 33 (refer to FIG. 5) of the first embodiment.

Consequently, according to the sixth embodiment, a transverse deviation of the air bag 81 can be restrained efficiently even in the event that an object 78 comes into collision with the curved surface of 87 the air bag 81.

In addition, by dividing the interior of the air bag 81 into a plurality of spaces (six spaces) with the left and right straps 82, 82 and the strap 83, the capacity of each space can be made smaller than the total capacity of the air bag 81.

Due to this, in the event that the colliding object 78 comes into collision with the curved surface 87 of the air bag 81, the increasing rate of pressure within the air bag 81 can be enhanced when compared with the conventional air bag (in which no strap is provided).

Consequently, by dividing the interior of the air bag 81 into the plurality of spaces (six spaces) with the left and right straps 82, 82 and the strap 83, since an initial pressure within the air bag 81 can be set low, the discharge of gas from the inflator can be reduced, whereby the miniaturization of the inflator can be attempted.

Note that while a plurality of examples in which the strap or straps are disposed within the air bag have been described in the first to sixth embodiments, the disposition of the strap or straps is not limited thereto and can be determined as required.

While only certain embodiments of the invention have been specifically described herein, it will apparent that numerous modifications may be made thereto without departing from the spirit and scope of the invention.

Being constructed as has been described heretofore, the invention can provide the following advantages.

According to the aspect of the invention, the constricted portion is formed on the outer circumferential surface of the air bag which faces the outer surface of the vehicle by providing the belt-like strap within the air bag, whereby the convexly curved portions which can come into contact with the outer surface of the vehicle are provided on the both sides of the constricted portion.

According to the construction, the convexly curved portions provided on the both sides of the constricted portion can be brought into contact with the outer surfaces of the vehicle, respectively. In addition, by forming the convexly curved portions on the both sides of the constricted portion, the distance between one of the convexly curved portions and the other thereof can be secured largely.

Thus, the air bag can be disposed on the outer surface of the vehicle stably by allowing the convexly curved portions provided on the both sides of the constricted portion to be brought into contact with the outer surfaces of the vehicle, respectively.

Due to this, for example, even in case a wind pressure is applied to the inflated and deployed air bag from the front side of the vehicle, the deviation of the air bag from the front pillar can be prevented.

Furthermore, in the event that an object comes into collision with an end portion of the air bag from the front side of the vehicle, the deviation of the air bag from the front pillar can be prevented.

As a result, since the air bag can be maintained in the condition in which the air bag extends along the front pillar, an impact exerted on the colliding object can efficiently be absorbed by the inflated and deployed air bag.

What is claimed is:

1. An outboard air bag system of a vehicle, comprising:
a pair of tubular air bags each operable to be inflated and deployed on an outer surface of the vehicle along one of a pair of front pillars on opposite sides of a front windshield, each of said air bags being attached to an inflator provided on a cowl of the vehicle, each of the air bags when inflated extending from the inflator longitudinally upwardly and rearwardly along the front pillar, each of said air bags having a longitudinal center portion; and
a strap in each of said air bags disposed in the longitudinal center portion so as to extend longitudinally, said strap having front and rear edges connected to the air bag to form a longitudinally constricted portion on a surface of the air bag which faces the outer surface of the vehicle and convexly curved portions on both sides of the constricted portion coming into contact with the outer surface of the vehicle, said front edges of said straps facing forwardly relative to said vehicle when said bags are inflated and said rear edges facing rearwardly;
wherein the convexly curved portions of each air bag contact the windshield and a garnish of the front pillar, respectively, so as to hold the air bags in place during deployment relative to wind currents.

2. The automotive outboard air bag system according to claim 1, wherein an upper end portion of the strap is disposed away from an upper end portion of the air bag by a predetermined distance.

3. The automotive outboard air bag system according to claim 1, wherein the strap comprises a plurality of straps extending in the longitudinal direction,
wherein front and rear side edges of the plurality of straps are connected to the air bag, respectively, so as to form constricted portions on a surface of the air bag which faces the outer surface of the vehicle, and
wherein convexly curved portions adapted to come into contact with the outer surface of the vehicle are provided outside of the constricted portions.

* * * * *